…

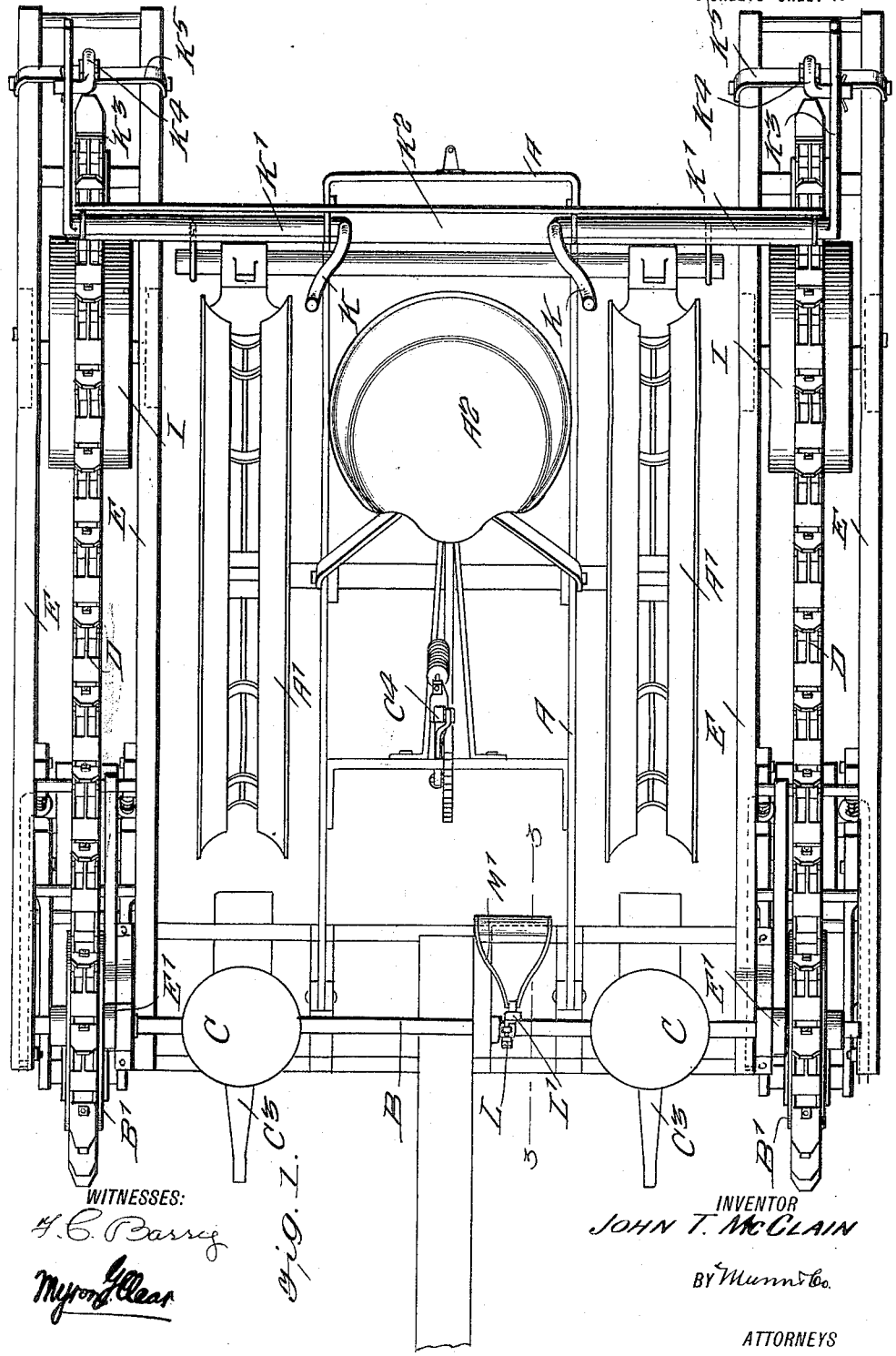

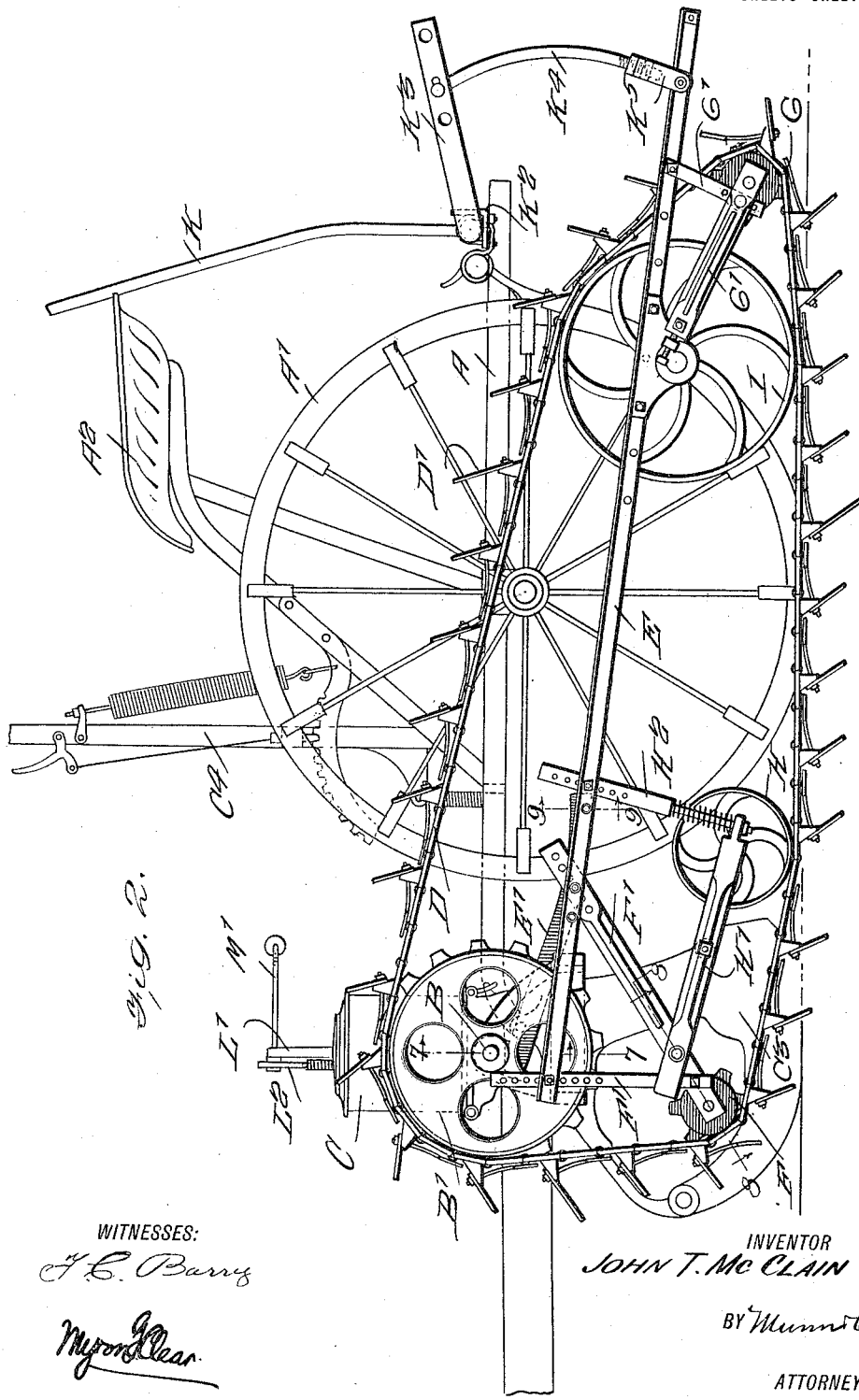

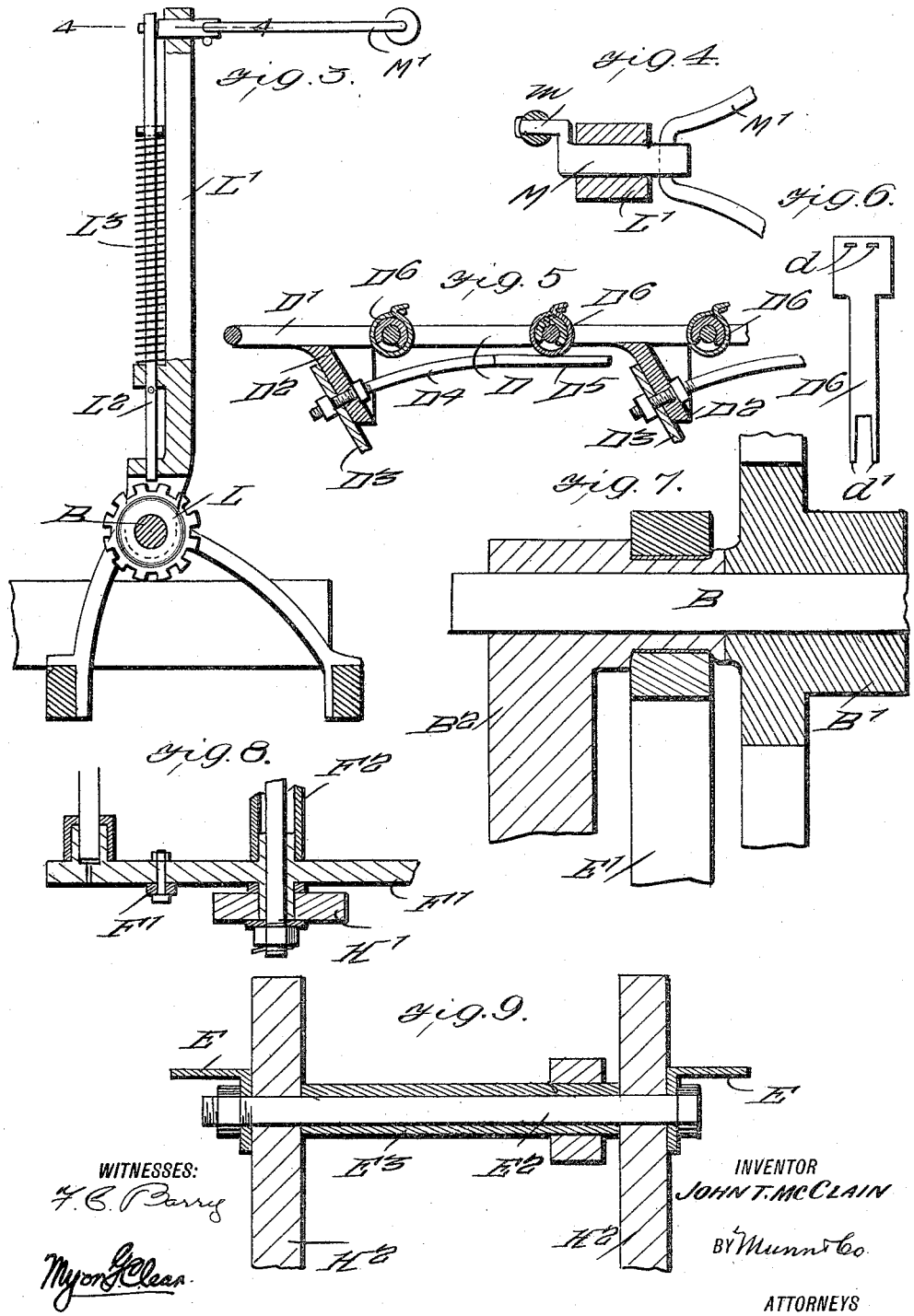

UNITED STATES PATENT OFFICE.

JOHN T. McCLAIN, OF GREENTOWN, INDIANA.

CORN-PLANTER.

1,193,281. Specification of Letters Patent. Patented Aug. 1, 1916.

Application filed December 1, 1915. Serial No. 64,464.

*To all whom it may concern:*

Be it known that I, JOHN T. MCCLAIN, a citizen of the United States, and a resident of Greentown, in the county of Howard and State of Indiana, have invented a certain new and useful Improvement in Corn-Planters, of which the following is a specification.

My present invention relates particularly to corn planters, more especially to check row planters, my object being to provide simple and efficient means for controlling and actuating the seed dropping mechanisms thereof, without the necessity for wire attachments, markers, or other cumbersome devices for this purpose now in use.

A further object of my invention is to provide simple and efficient means for measuring and marking off the land and spacing and alining the seed hills, irrespective of the shape or lay of the land to be planted, without necessitating alighting of the operator from the planter in the course of the work.

A still further object of my invention is to provide simple and readily adjustable means for the above purpose, capable of use either as a part of a seed planting machine of special construction, or as an attachment for machines now in use.

Other objects and the resulting advantages of my invention will more clearly appear from the following description, in the course of which reference is made to the accompanying drawings, forming a part of this specification, and in which—

Figure 1 is a plan view illustrating my improvements as part of a machine especially constructed to utilize the same. Fig. 2 is a side elevation thereof. Fig. 3 is a detail vertical section taken substantially on line 3—3 of Fig. 1, illustrating the lever and connections with the transverse shaft for adjusting the parts of my invention when out of contact with the ground. Fig. 4 is a detail horizontal section taken substantially on line 4—4 of Fig. 3. Fig. 5 is a longitudinal section taken through a portion of one of the endless chains. Fig. 6 is a detail plan of one of the dust bands used around the joints of the chain. Fig. 7 is a detail vertical section taken substantially on line 7—7 of Fig. 2. Fig. 8 is a similar view taken substantially on line 8—8 of Fig. 2. Fig. 9 is another similar view taken substantially on line 9—9 of Fig. 2.

Referring now to these figures, I propose to provide a planter including a wheeled frame and seed-dropping mechanism, with a pair of endless ground-engaging chains located at opposite sides of the main frame and having operative connection, through a transverse shaft, with the seed dropping mechanism, whereby the movements of these chains through the engagement of ground-entering shovels carried thereby, may be communicated to the seed dropping mechanism for the purpose of actuating the latter during movement of the machine, the chains with their ground entering members marking off the land and having means whereby to particularly mark certain points at which the seeds are dropped, whereby the operator may thus, through means hereinafter described for adjusting the chains when free of contact with the ground, aline the seed hills throughout the entire field being planted, and without alighting from the machine during the course of the work.

In the several figures, the main frame of the planter is indicated generally at A, the ground wheels A′ appearing in Figs. 1 and 2, and the transverse shaft B appearing in these figures as well. This transverse shaft B, which may be suitably journaled and supported with respect to the main frame A, may be directly connected to the seed dropping mechanisms at the lower ends of the seed boxes C as seen in Figs. 1 and 2, wherein my improvements are utilized in connection with a machine especially built for the purpose, as will be hereinafter seen, shaft B extending, as will be seen by reference to these figures, directly beneath the seed boxes C just mentioned. It is to be understood my improvements are used as attachments, however, in which event shaft B will be suitably connected to the seed boxes C′ to actuate the seed dropping parts. In either case, however, the opposite ends of the shaft B extend beyond the adjacent sides of the main frame, as clearly seen by reference to Fig. 1, and are there provided with enlarged sprocket wheels B′, over which the upper forward portions of the endless chains D pass as best seen by reference to Fig. 2, each of these chains being disposed within a supplemental side frame consisting of parallel side bars E having forward inner bearing arms E′ extending upwardly and journaled upon shaft B adjacent the sprocket wheels B′ as seen in Figs. 2 and 7, to form the fulcrum for the supplemental side frame upon which the rear ends of the latter may be raised and lowered, the forward portions of which frames may also be raised and lowered due to the fact that the bearings $B^2$ of the shaft B are raised and lowered with the seed guides or runners $C^3$, as shown in Fig. 2, adjustable toward and away from the ground through the usual connections from the upright lever $C^4$ adjacent the driver's seat $A^2$.

In each of the adjustable supplemental side frames E are adjustably connected the supporting arms $F'$ and $G'$ of forward and rear sprocket wheels F and G respectively, around which the forward and rear ends of the chains D travel, presser wheels H and I being also mounted in each of these side frames and engaging the lower runs of the chains D to press the latter in close contact with the ground when the frames E are lowered to operative position, the former of which is pivotally connected to certain of the adjustable supporting bars $F'$ of the forward sprocket wheel F and is adjustably connected by supporting bars $H^2$ of the side bars E of the respective supplemental frame. Each of the supplemental side frames also has its side bars E connected in spaced relation by connecting bolts $E^2$, around which are disposed spacing sleeves $E^3$ between the side bars, as seen in Fig. 9, similar spacing means $F^2$ as seen in Fig. 8, being utilized to space the supporting arms $F'$ of the sprocket wheel F, as well as the supporting arms of the other guide wheels.

Each of the chains D consists of a number of links $D'$, alternate ones of which as most clearly seen in Fig. 5, are provided with outwardly inclined brackets $D^2$, to which the ground entering shovels $D^3$ are bolted. This bolted connection is at one end of inwardly curved arms $D^4$, the inner free ends of which are enlarged and flattened as at $D^5$ to cover the joints of the chain between links $D'$ located at points between the brackets $D^2$. Dust bands $D^6$, one of which is shown in detail in Fig. 6, are provided with slots $d$ at one end and corresponding extensions $d'$ at their opposite ends adapted to be bent through the slots $d$ and crimped, to thus hold the dust bands around the joints between the links $D'$ as best seen in Fig. 5.

Referring now to Fig. 2, it will be seen that certain of the ground entering shovels, namely, those indicated in this figure at $D^7$, are of considerably increased size with respect to the other ground entering shovels $D^3$, these enlarged shovels $D^7$ being spaced apart a distance corresponding to a full rotation of shaft B between them, and being thus located in definite relation to the seed dropping operation. Thus, if the seed hills are to be spaced more or less than usual, the relation between the enlarged shovels $D^7$ and the seed dropping operations may be maintained by utilizing a larger or smaller size of sprocket wheel $B'$ and in either introducing additional links into the chain between these shovels $D^7$ or removing certain links. For this purpose the adjustment of the sprocket wheels F and G, by means of their supporting arms $F'$ and $G'$, as well as adjustment of the forward presser roller H by means of its arms $H'$ and $H^2$, becomes necessary.

The rear portions of these supplemental frames above mentioned, may be raised through the medium of upright levers K disposed at the rear of the operator's seat as most plainly seen by reference to Figs. 1 and 2, these levers being formed upon the inner ends of horizontal rotatable bars $K'$ journaled in a lateral support $K^2$ mounted upon the rear portion of the main frame A, and at the outer ends of which bars $K'$ are rearwardly projecting angular extensions $K^3$ to which are secured the upper ends of depending rods $K^4$ connected at their lower ends by yokes $K^5$ with the rear ends of the side bars E of the supplemental frame. Thus, forward movement of the upper ends of levers K serves to raise the rear ends of the supplemental frames with the chains D and the several other connections mounted therein upon the forward shaft B as a fulcrum.

It will be noted by reference to the several figures that the transverse shaft B in each case is provided with an intermediate toothed wheel L and that adjacent this gear wheel is an upright lever $L'$ journaled at its lower end upon the shaft B and supporting in bearings thereon a vertically movable rod $L^2$, the lower end of which is engageable with the teeth of wheel L. This rod $L^2$ is normally held in its uppermost position out of contact with the toothed wheel L through the medium of a spring $L^3$ and is provided at its upper end with an aperture receiving the offset forward end $m$ of a horizontal rotatable pin M journaled through the upper end of the lever $L'$ and provided with a handle $M'$ adapted to be grasped by the operator. Thus, when the supplemental frames E are raised free of contact with the ground, for instance, at the end of a row and the beginning of the next row, the operator may grasp the handle $M'$ and, by rotating the pin M, cause lowering movement of rod $L^2$ and engagement of the lower end thereof with the teeth of gear wheel L. Being so engaged, the operator may thus from his seat rotate the shaft B and cause adjustment or movement of the chains D in order to bring their enlarged shovels $D^7$ before mentioned, into registry with the openings made by these shovels in the ground during the planting of the preceding row, so that in further planting the seed hills will be properly alined as is desired. Thus, whenever the supplemental frames are in lowermost position and the chain D is upon the ground, the machine is ready for operation. As the planter moves over the ground, across a field to be planted, the movement of chain D, actuated by movement of the machine over the ground, starts the planting of the corn, dropping the same in spaced hills alined with those points where the enlarged shovels $D^7$ enter the ground. When the end of the field is reached, the seed runners are raised before turning the machine, which action will raise the front end of the supplemental frames. The operator then raises the rear ends of these supplemental frames by moving levers K forwardly, and after the machine is turned, the enlarged shovels $D^7$ must be alined with the marks made in the ground thereby during the course of the preceding row. To do this the operator grasps the handle M' and rotates the shaft B as before described and after such alinement is reached, the operator is then free to proceed upon the next row.

These several adjustments during the course of planting a field may, as will be thus apparent, be accomplished without necessitating alighting of the operator from the machine. Of course it is to be understood that the other adjustments, those providing for the planting of hills more or less spaced than ordinary, by changing the sprocket wheels B' for ones of greater or less size, and either adding to or removing from the links of chain D, must be accomplished before the machine is transported to the field for operation.

By the use of my improved apparatus which may, as before stated, be utilized either as a part of a specially constructed planter, or as an attachment for planters now in use, the land may be clearly and evenly marked off, forming an efficient guide for the planter in its operation, and the hills may be properly alined as is desirable, without the use of the wire attachment or marker now in common vogue, or other cumbersome, unwieldy, and inefficient devices for this purpose heretofore proposed.

I claim:—

1. In a planter including a main wheeled frame and seed dropping mechanisms therein, endless chains mounted at opposite sides of said main frame, and including links certain of which are provided with inclined outstanding brackets, ground entering shovels secured at their inner portions to said brackets whereby to outstand from the links at inclined angles with respect thereto, and operative connections between the said endless chains and the said seed dropping mechanisms, certain of said shovels at spaced points on the chains being of greater lengths than the others.

2. In a planter including a main wheeled frame and seed dropping mechanisms therein, endless chains mounted at the sides of the main frame and including links certain of which are provided with inclined outstanding brackets, shovels secured at their inner portions to said brackets whereby to outstand therefrom and enter the ground at inclined angles with respect to the links, the shovels of the various links being of the same shape and similarly projecting from the links, and certain of said shovels being of increased length with respect to the other shovels, for the purpose described.

3. In a planter, including a main wheeled frame and seed dropping mechanisms therein, endless chains at opposite sides of the frame, each having a series of links, certain of which are provided with inclined outstanding brackets, ground entering shovels attached to said brackets, arms the outer ends of which are extended through the said brackets and the said shovels whereby to rigidly connect the same and the shovels with the said brackets, said arms having flattened inner ends overlying the pivotal connections between the links.

JOHN T. McCLAIN.

Witnesses:
JOHN W. MELTON,
HENRY HUNT.

Copies of this patent may be obtained for five cents each, by addressing the "Commissioner of Patents, Washington, D. C."